United States Patent
Garcia et al.

(10) Patent No.: US 7,458,715 B2
(45) Date of Patent: Dec. 2, 2008

(54) RELEASABLE COUPLING ARRANGEMENT BETWEEN THE TOOL SHANK AND MOTOR ASSEMBLY OF HAND-HELD BLENDERS

(75) Inventors: Javier Hidalgo Garcia, Tolosa (ES); Aitor Aguirrezabalaga Zubizarreta, Azpeitia (ES)

(73) Assignee: Sammic, S. L., Guipuzcoa (ES)

( * ) Notice: Subject to any disclaimer, the term of this patent is extended or adjusted under 35 U.S.C. 154(b) by 359 days.

(21) Appl. No.: 11/423,807

(22) Filed: Jun. 13, 2006

(65) Prior Publication Data

US 2006/0291325 A1    Dec. 28, 2006

(30) Foreign Application Priority Data

Jun. 13, 2005    (ES)    ............... 200501359 U

(51) Int. Cl.
    *A47J 43/044*    (2006.01)
    *A47J 43/07*    (2006.01)

(52) U.S. Cl. ........................ 366/129; 403/329

(58) Field of Classification Search ................ 366/129, 366/331, 344; 99/348; 464/160, 177; 403/326, 403/327, 329, 322.1, 322.2
See application file for complete search history.

(56) References Cited

U.S. PATENT DOCUMENTS

| | | | | |
|---|---|---|---|---|
| 2,065,908 A | * | 12/1936 | Pihl | ............................. 292/76 |
| 4,462,142 A | * | 7/1984 | Hickling | ...................... 403/329 |
| 5,567,047 A | * | 10/1996 | Fritsch | ........................ 366/129 |
| 5,685,208 A | * | 11/1997 | Tidwell | ..................... 81/177.85 |
| 6,554,524 B1 | * | 4/2003 | Smith | ............................ 403/78 |
| 6,789,933 B2 | * | 9/2004 | Gili et al. | ...................... 366/129 |
| 6,811,298 B2 | * | 11/2004 | Penaranda et al. | ........... 366/129 |
| 6,955,117 B2 | * | 10/2005 | Naud et al. | ..................... 99/348 |
| 7,066,639 B2 | * | 6/2006 | Naud et al. | .................... 366/129 |
| 7,186,051 B2 | * | 3/2007 | Benedetti et al. | ............. 403/388 |
| 2006/0291325 A1 | * | 12/2006 | Garcia et al. | ................. 366/129 |

FOREIGN PATENT DOCUMENTS

| | | | |
|---|---|---|---|
| EP | 1733665 A2 | * | 12/2006 |
| EP | 1747745 A1 | * | 1/2007 |
| FR | 2794017 | * | 12/2002 |

* cited by examiner

*Primary Examiner*—Charles E Cooley
(74) *Attorney, Agent, or Firm*—Collen IP; Donald J. Ranft

(57) ABSTRACT

The invention discloses an arrangement specially designed for the releasable coupling of a tool shank and a motor assembly of the type used in hand-held blenders. The motor assembly has a cylindrical nozzle that projects from the distal base thereof, inside which the output shaft of the motor is housed, on the outer side of which it has a threaded formation to quickly screw it onto the tool shank. The coupling arrangement has a secure means of retention of the tool shank in the position in which it is coupled to the motor assembly, this means consisting of a click-in piece that secures the distal base of the motor assembly and substantially projects from the plane of said base, together with the formation of multiple partitions formed inside the bell on the coupling end of the tool shank, these partitions extending radially and angularly equally-spaced to define cavities designed to receive and retain the click-in piece during the coupling operation of the tool shank and the motor assembly.

1 Claim, 3 Drawing Sheets

RELEASABLE COUPLING ARRANGEMENT BETWEEN THE TOOL SHANK AND MOTOR ASSEMBLY OF HAND-HELD BLENDERS

OBJECT OF THE INVENTION

The present invention relates to a releasable coupling arrangement between the tool shank and the motor assembly of hand-held blenders, which provides essential novel characteristics and considerable advantages compared to the means that are known and used for the same purposes in the current state of the art.

More particularly, the invention proposes an arrangement that makes it possible to couple the tool shank of a hand-held blender and the motor assembly thereof, simply and quickly, but with the user's absolute certainty that the connection between the two parts has been correctly performed, and with the particularity that such a coupling allows the tool shank to be released, or the two parts to be separated, whenever the user desires, which can also be simply and conveniently performed by the user, but without it being possible for this separation of the parts to occur accidentally at any time.

The invention's field of application is obviously within the industrial sector that manufactures household and kitchen utensils, both for domestic and industrial use.

BACKGROUND AND SUMMARY OF THE INVENTION

It is a widely known fact that hand-held blenders of the type referred to by the present invention have a motor assembly that includes an electric motor that can be electrically powered and which constitutes the drive part, with an output shaft, and a tool shank that, when correctly coupled to said motor assembly, allows the movement of the motor to be transmitted to the proximal end of the shaft that runs along the length of said shank, and which on its opposite end, or distal end, has a blade for cutting and blending the food to which it is applied.

As will be understood, it is necessary for the coupling between the tool shank and the motor assembly to have suitable characteristics that guarantee sufficient safety conditions during its use, but which also allow the tool shank to be released, i.e. allow the tool shank to be separated from the motor assembly with a view to subjecting the former to the necessary operations to keep it in good conditions of hygiene and cleanliness, in addition to any other maintenance operation or even replacement of the tool shank in the event of it breaking or suffering irreparable damage.

The normal connection between a tool shank and motor assembly in a blender of the type considered here currently consists of the provision of a screw or bayonet type connection. Screw and bayonet connections can be designed in such a way that they are more or less easy to engage/disengage. However, both types of coupling, assembly and fastening have certain drawbacks in practice, because if these connections are performed in such a way that they are easy to engage/disengage, they occasionally present the problem that they accidentally become disengaged while the blender is in use, which clearly represents a hazard for the user; on the other hand, if the coupling is performed in such a way that it is difficult for the user to engage/disengage, this presents a different set of problems, as releasing the tool shank would mean applying excessive force, therefore making it impossible for the user to separate the two parts.

Bearing in mind the drawbacks that exist in the current state of the art with regard to said hand-held blenders, in particular with respect to engaging/disengaging the tool shank and the motor assembly, the main objective proposed by the present invention is to design a coupling that allows the user to perform the coupling or releasing operation easily, conveniently and quickly, yet at the same time with absolute certainty that the connection between the two parts is stable, without the possibility of accidental separation while it is in use, and with the user's full knowledge that the connection has been correctly established.

This objective has been fully achieved by the releasable coupling arrangement of the invention, which will be explained below, and the characteristics of which are contained in the characterising part of the attached claim 1.

Essentially, the coupling proposed by the invention is of the type that uses screw connections between the inner nut on the bell at the top of the tool shank and the cylindrical projection or nozzle that extends from the motor assembly surrounding the drive shaft that is connected to the motor, said screw connection corresponding to a design of the quick coupling type, with the particularity that the motor assembly itself additionally includes, in a position closely adjacent to said output nozzle, a plastic piece that constitutes a retaining click-in element, for the purpose of which said plastic piece, which can give elastically to a certain degree, presents a rounded-edged transversal v-shaped bend that substantially projects from the plane of the end face of said motor assembly. In turn, the bell part of the tool shank, in addition to having a threaded section on its coupling nut that can be fitted to the threaded section formed on the outer surface of the output nozzle of the motor assembly, has its inner area divided into sectors by means of radial partitions of such a height that when the tool shank and the motor assembly are coupled, said retaining click-in piece is finally housed in one of the hollow inner sectors of the coupling bell, the force of the elastic give being sufficient to keep the tool shank coupled without the possibility of accidental releases thereof, whilst its strength is such that it allows any user to release the tool shank with a simple untwisting movement. Moreover, the provision of the elastic retaining click-in piece simultaneously constitutes a means of "notifying" the user that the parts have been fully fitted together, thanks to the click that is heard whenever the piece is pushed into place over the corresponding partition of the coupling bell as the tool shank is being screwed onto the motor assembly.

As will be understood, with a coupling arrangement designed in such a way as that described above, not only does it ensure a correct positioning of one part (the tool shank) in relation to the other (the motor assembly), but also the user is aware at all times that the blender is being used correctly and safely.

BRIEF DESCRIPTION OF THE DRAWINGS

These and other characteristics and advantages of the invention will be more clearly shown by means of the detailed description that follows of a preferred embodiment thereof, which is provided as an illustrative and non-limiting example, with reference to the drawings that accompany it, wherein.

DESCRIPTION OF A PREFERRED EMBODIMENT

Figure 1:
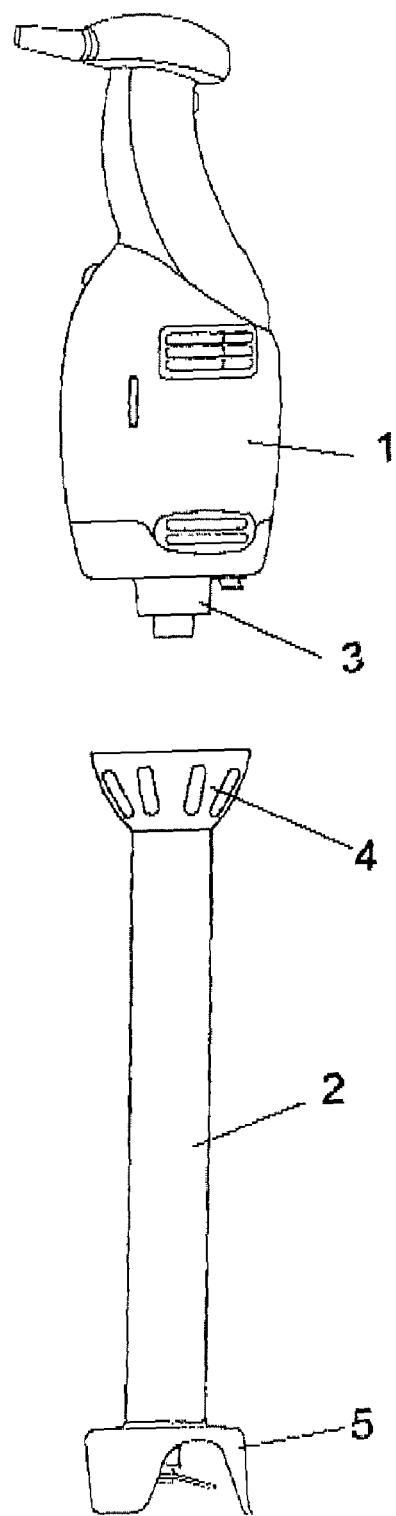
FIG. 1 shows a general side elevation view of a conventional hand-held blender, wherein the tool shank and the motor assembly appear separately, one above the other.

As has been indicated above, a detailed description of the invention will be given below with the aid of the attached drawings, wherein the same numerical references will be used to designate identical or similar parts. Thus, looking first at FIG. 1, it shows a side elevation view of a conventional hand-held blender consisting of a motor assembly 1 and a tool shank 2, which appear one above the other in a position prior to being coupling. The motor assembly includes an output nozzle 3 that surrounds the end of the drive shaft of the electric motor that is enclosed inside the motor assembly 1, and the tool shank has a bell 4 for coupling to the proximal end, or coupling end, whilst at the distal end it has a protective element 5 that surrounds an inner cutting blade (not shown in the Figure), and which is connected, as regards its rotation, to a shaft that runs along the inside of said tool shank, and the proximal end of which can be coupled to the end of the drive shaft inside the nozzle 3 to transmit the drive movement from the nozzle to the end blade.

As will be understood, this description corresponds to a conventional embodiment, i.e. of the type used in blenders belonging to the current state of the art, and which the invention has taken as the starting point for developing the novel and improved releasable coupling proposed herein.

Figure 2:
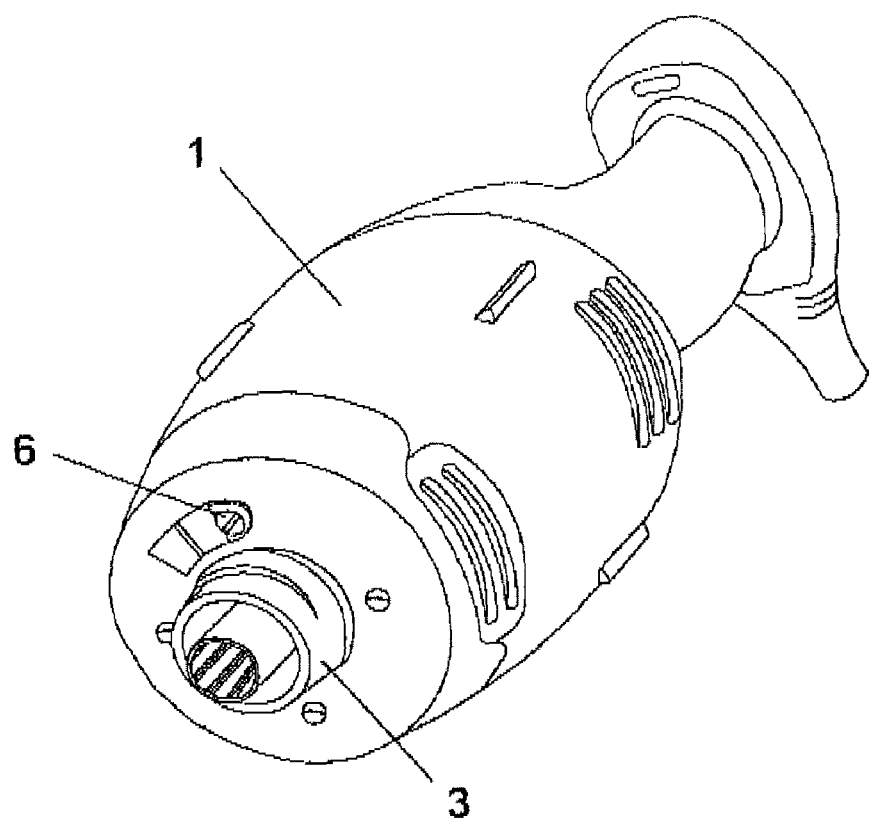
FIG. 2 is a perspective view of the motor assembly of a blender of the type shown in the previous figure, as seen from the coupling end.

Effectively, looking at FIG. 2 it can be seen that the motor assembly 1 is shown in perspective from underneath, i.e. from the end that couples with the tool shank. As can be seen, the nozzle 3 has a short threaded section on its outer surface, whilst the underside or base of the motor assembly 1 has a screwing means 6 in a predetermined position. This is the chosen position in which to mount the retaining click-in piece.

Figure 3:
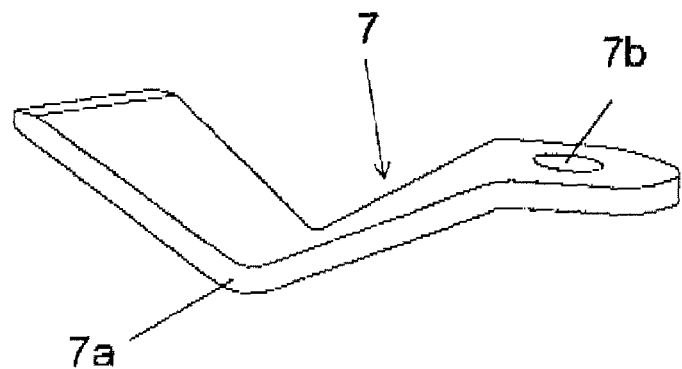
FIG. 3 shows a perspective view of a retaining click-in piece according to the invention.
Figure 4:
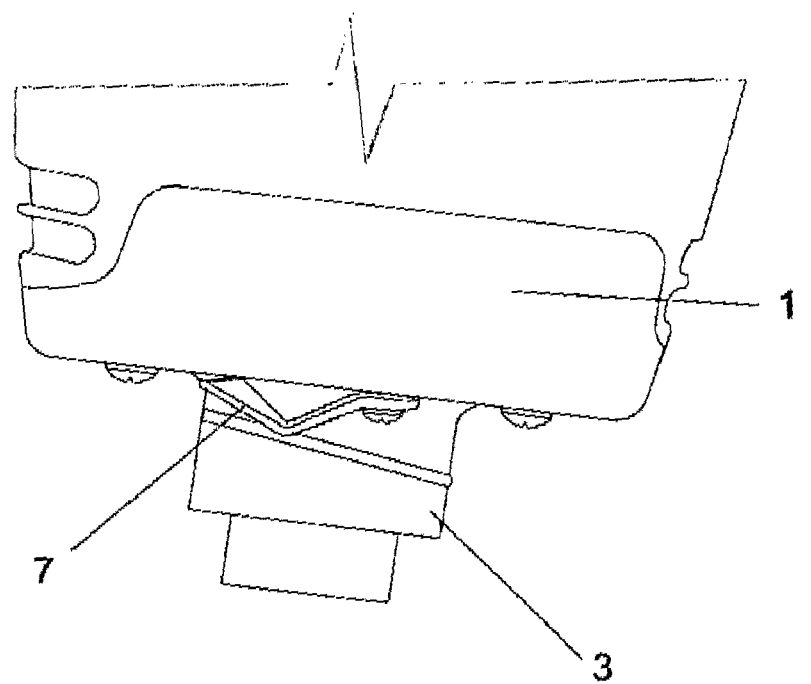
FIG. 4 is a side elevation view of an end portion of the motor assembly shown in FIG. 2, wherein the retaining click-in piece shown in FIG. 3 has been assembled, and FIG. 5 finally shows a perspective view of a portion of a tool shank corresponding to the end on which the coupling bell is assembled.

Said retaining click-in piece, which can be identified by reference number 7 in FIGS. 3 and 4, is preferably a piece made from a plastic material using some type of moulding technique and it consists of a laminar body, which has a transversal bend 7a in a certain position to form a v-shape, leaving a rounded edge on the outer face, whilst one end is provided with a hole 7b. The retaining click-in piece thus formed is especially suitable for being mounted on the underside of the motor assembly 1, for which the screwing means 6 passes through the hole 7b in the piece 7, immobilising it with said screw 6, and is disposed in such a way that the bent formation considerably projects from the plane of the underside of the motor assembly 1, as is shown by the drawing in FIG. 4.

Figure 5:
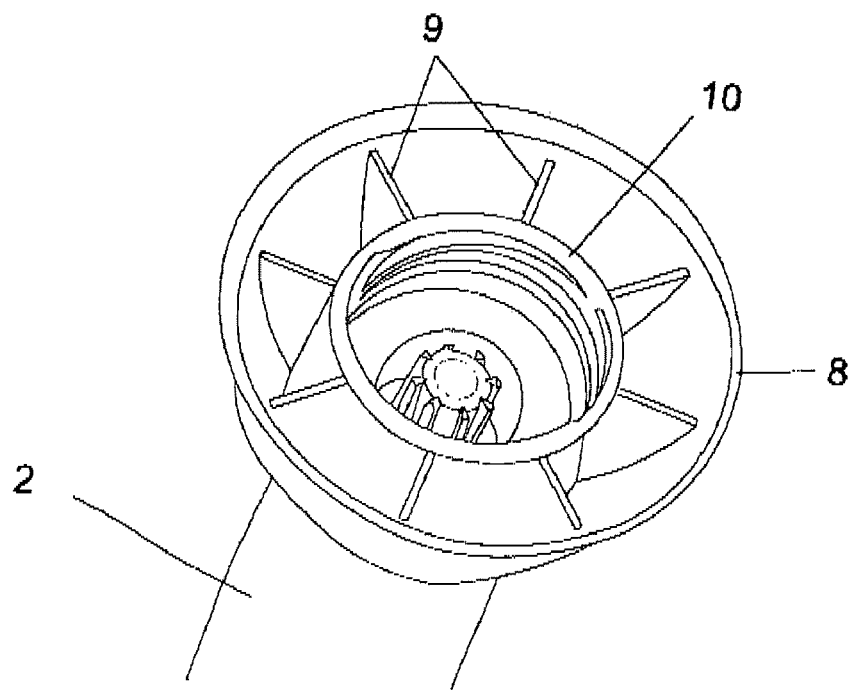

Lastly, FIG. 5 shows a perspective view of the proximal end of the tool shank 2, with the inclusion of a coupling bell with a central portion of internally threaded nut 10 encloses therein for its screw connection to the threaded section formed on the outside of the nozzle 3, and with multiple angularly equally-spaced partitions 9 that extend radially between said threaded nut formation 10 and the body of the bell 8. According to this arrangement, it is clear that the situation of the partitions 9 forms successive hollow sectors, which are laterally delimited by said partitions. It is precisely these partitions that the invention makes use of to ensure a truly effective and safe coupling between the tool shank 2 and the motor assembly 1, because when this coupling action is performed by screwing the portion of threaded nut 10 connected to the coupling bell 8 to the nozzle 3 of the motor assembly 1, it is clear that as one part moves closer to the other it will mean that at least one of the partitions 9 reaches and acts against the bent formation 7a of the retaining click-in piece 7, forcing said piece to give elastically in such a way that once said partition has passed that position, the elastic recovery of the retaining click-in piece 7 means that it returns to its normal shape, that section of the piece therefore being housed in the next cavity and thereby keeping the piece in that position and preventing its subsequent undesired accidental movement.

As will be understood, with a solution such as that provided by the coupling arrangement of the present invention, it is extraordinarily simple to provide effective solutions to the problems currently associated with this type of releasable couplings between a motor assembly and a tool shank and, as has been said, in turn it constitutes a quick and safe connection between the parts that the blender comprises.

It is not considered necessary to prolong this description to enable a person skilled in the art to understand the scope and advantages deriving from the invention, and to develop and put into practice the object thereof.

However, it must be understood that the invention has been described according to a preferred embodiment thereof, which means that it may be subject to modifications without this involving any alteration to the basic concept of said invention, such modifications affecting the shape, size and/or materials employed in manufacturing.

The invention claimed is:

1. Releasable coupling arrangement between the tool shank and the motor assembly of hand-held blenders, in particular a coupling arrangement that enables the user to separate the tool shank (2) from the motor assembly (1) of the blender when cleaning, maintenance or replacement operations of the tool shank (2) are to be performed, the connection between which is performed by means of an externally threaded cylindrical nozzle (3) formed on the underside of the motor assembly (1), through which the drive shaft is accessed, and a nut portion (10) complementarily threaded on its inner face formed on the inside of a coupling bell piece (8) on the proximal end of the tool shank (2), the inside of the coupling bell also having multiple angularly equally-spaced partitions (9) that extend radially between said nut portion (10) and the body of the coupling bell (8) to form a succession of hollow interior sectors, which is characterised in that the motor assembly (1) additionally includes a screwing means (6) on its underside or coupling end, in a position closely adjacent to said nozzle formation (3), said screwing means (6) being able to pass through a hole (7b) formed in the end of a retaining click-in piece (7), which is kept in place by said screwing means (6), and in that said retaining click-in piece (7) consists of a laminar body made from a plastic material formed in such a way that it has a rounded-edged transversal v-shaped bend (7a) that is designed so that when the piece (7) is coupled to the end of the motor assembly (1), the bent portion (7a) substantially projects from the plane of the base on which it is mounted, thus constituting a means of retaining and maintaining the connection between the tool shank (2) and the motor assembly (1) thanks to said bend being housed inside any of the sectors of the bell (8) that are delimited by two of said successive partitions (9).

* * * * *